United States Patent
Choi et al.

(10) Patent No.: US 8,195,999 B2
(45) Date of Patent: Jun. 5, 2012

(54) APPARATUS AND METHOD FOR SUPPORTING HYBRID AUTOMATIC REPEAT REQUEST IN WIRELESS COMMUNICATION SYSTEM

(75) Inventors: Seung-Hoon Choi, Suwon-si (KR);
Chi-Woo Lim, Suwon-si (KR);
Song-Nam Hong, Suwon-si (KR);
Sung-Eun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 12/587,067

(22) Filed: Oct. 1, 2009

(65) Prior Publication Data

US 2010/0088570 A1  Apr. 8, 2010

(30) Foreign Application Priority Data

Oct. 2, 2008  (KR) ..................... 10-2008-0097230

(51) Int. Cl.
*H04L 1/18* (2006.01)
*H04L 12/26* (2006.01)
*H03M 13/00* (2006.01)
*G01R 31/28* (2006.01)
*H04W 72/00* (2009.01)

(52) U.S. Cl. ........ 714/748; 714/752; 714/712; 370/229; 370/233; 370/235; 455/451

(58) Field of Classification Search ............... 714/748, 714/752, 712; 370/229, 233, 235; 455/451
See application file for complete search history.

(56) References Cited

U.S. PATENT DOCUMENTS

| 7,133,462 | B2 * | 11/2006 | Ha et al. ............ | 375/295 |
|---|---|---|---|---|
| 7,155,236 | B2 * | 12/2006 | Chen et al. .......... | 455/454 |
| 7,165,204 | B2 * | 1/2007 | Cudak et al. ........ | 714/751 |
| 7,272,110 | B2 * | 9/2007 | Lee et al. ............ | 370/209 |
| 7,813,361 | B2 * | 10/2010 | Lee et al. ............ | 370/412 |

FOREIGN PATENT DOCUMENTS

KR  EP 1422855 A1 *  5/2004

* cited by examiner

*Primary Examiner* — John J Tabone, Jr.

(57) ABSTRACT

A wireless communication system includes an apparatus and a method for supporting Hybrid Automatic Repeat Request. A transmitting method includes when an encoding packet is bigger than a maximum encoding packet size Nep_max, generating a first codeword by encoding the encoding packet at a mother code rate t; generating a second codeword by selecting [Nep_max/t]-sized code bits from the first codeword; and performing Hybrid Automatic Repeat reQuest (HARQ) using the second codeword.

20 Claims, 5 Drawing Sheets

APPARATUS AND METHOD FOR SUPPORTING HYBRID AUTOMATIC REPEAT REQUEST IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Oct. 2, 2008 and assigned Serial No. 10-2008-0097230, the entire disclosure of which is hereby incorporated by reference.

TECHNICAL FIELD OF THE INVENTION

The present invention relates generally to an apparatus and a method for supporting Hybrid Automatic Repeat Request (HARQ) in a wireless communication system. More particularly, the present invention relates to an apparatus and a method for increasing a data throughput in the HARQ of the wireless communication system.

BACKGROUND OF THE INVENTION

Many wireless communication techniques are suggested as candidates for a high-speed mobile communication. Among the candidate techniques, an Orthogonal Frequency Division Multiplexing (OFDM) scheme is recognized as a leading future-generation wireless communication technique. Wireless Metropolitan Area Network (WMAN) of Institute of Electrical and Electronics Engineers (IEEE) 802.16 is adopting the OFDM as its standard.

To raise reliability of the data transmission, wireless communication systems are making use of a Hybrid Automatic Repeat Request (HARQ) scheme which incorporates a Forward Error Correction (FEC) scheme and an Automatic Repeat Request (ARQ) scheme.

Using the HARQ scheme, a receiver corrects errors of a packet received from a transmitter through an error detecting code. Next, the receiver determines whether to request the retransmission based on the error detecting code (e.g., Cyclic Redundancy Check (CRC) code) of the error-corrected packet. When receiving a retransmission packet from the transmitter, the receiver can obtain an additional gain (e.g., coding gain and Signal to Noise Ratio (SNR) increase) by decoding the retransmission packet and the previously received packet through Increment Redundancy (IR) or Chase Combining (CC).

To use the HARQ scheme, the receiver requires a buffer for storing an initial HARQ packet. A size of the buffer can vary depending on the cost or the use of the receiver.

When failing to receive the initial transmission HARQ packet, the receiver requests the retransmission to the transmitter and receives the retransmission HARQ packet from the transmitter. Next, the receiver determines whether to concatenate the received retransmission HARQ packet after the pre-stored initial transmission HARQ packet or to combine the received retransmission HARQ packet with the initial transmission HARQ packet, or to concatenate the retransmission HARQ packet in a certain region after the initial transmission HARQ packet and combine the remaining part with the front part of the initial transmission HARQ packet.

In general, the transmitter generates a codeword by encoding the encoding packet at a Mother Code Rate (MCR) and transmits HARQ packets by splitting the codeword to the HARQ packets according to the HARQ scheme. Correspondingly, as combining or concatenating the packets, the receiver requires information relating to the MCR, the size Nep of the encoding packet, or the codeword length.

In an IEEE 802.16e standard system, a base station and a terminal carry out HARQ buffer capability negotiation prior to the data transmission so as to support the buffer of various sizes. For example, the terminal informs the base station of the HARQ buffer capability including Nep_max information and Aggregation (Ag) information. Herein, Nep_max indicates a maximum data amount storable per HARQ channel and Ag indicates whether the buffer of the other HARQ channel is usable or not. For example, when the number of the HARQ channels is '4', the buffer size for each HARQ channel is '100', and the Ag field is set to 'on', the base station can transmit data of the maximum size '100'. The terminal can store the data of the maximum size '400' using four buffers.

The base station and the terminal determine the Nep_max value according to the storage capability of the buffer of the terminal. That is, the base station enables the communication in consideration of the buffer of the terminal by encoding and transmitting data of the smaller size than Nep_max. When a considerable data throughput is required, the base station and the terminal set the Ag field to 'on'. Accordingly, the base station is able to transmit data in the greater size than Nep_max. The terminal can also store data in the size greater than Nep_max using a plurality of buffers for the multiple HARQ channels.

As discussed above, when one HARQ channel occupies the buffer for another HARQ channel, the terminal cannot receive data of a new HARQ channel until the operation for the corresponding HARQ channel is finished. Additionally, since the total size of the buffers of the terminal is limited, the data length transmittable from the base station to the terminal is restricted although the Ag field is set to 'on'. Thus, a novel method is required to support a high data throughput without interrupting a new HARQ channel.

SUMMARY OF THE INVENTION

To address the above-discussed deficiencies of the prior art, it is a primary aspect of the present invention is to address at least the above mentioned problems and/or disadvantages and to provide at least the advantages described below. Accordingly, an aspect of the present invention is to provide an apparatus and a method for Hybrid Automatic Repeat Request in consideration of a buffer size of a terminal in a wireless communication system.

Another aspect of the present invention is to provide an apparatus and a method for increasing a data throughput in HARQ of a wireless communication system.

Yet another aspect of the present invention is to provide an apparatus and a method for increasing a data throughput without interrupting a new HARQ channel in HARQ of a wireless communication system.

Still another aspect of the present invention is to provide an apparatus and a method for communicating packets bigger than a negotiated size in HARQ of a wireless communication system.

According to one aspect of the present invention, a method for transmitting a packet at a transmitter in a wireless communication system includes when an encoding packet is bigger than a maximum encoding packet size Nep_max, generating a first codeword by encoding the encoding packet at a mother code rate t; generating a second codeword by selecting [Nep_max/t]-sized code bits from the first codeword; and performing HARQ using the second codeword.

According to another aspect of the present invention, a method for receiving a packet at a receiver of a wireless communication system includes negotiating with a transmitter for a maximum encoding packet size Nep_max which corresponds to a storage buffer size for one HARQ channel; receiving a HARQ packet from the transmitter; when the HARQ packet received from the transmitter is an initial transmission packet, decoding the received HARQ packet; when error is detected from the decoded HARQ packet, storing the HARQ packet to a buffer for a corresponding HARQ channel; and feeding back a retransmission request of the HARQ packet to the transmitter. When the transmitter has an encoding packet bigger than the maximum encoding packet size, the HARQ packet is generated from a [Nep_max/t]-sized second codeword corresponding to part of a first codeword which is generated at the transmitter by encoding the encoding packet at a mother code rate t.

According to yet another aspect of the present invention, an apparatus for a transmitter in a wireless communication system includes a controller for negotiating with a receiver for a maximum encoding packet size Nep_max; and an encoder for, when an encoding packet is bigger than the maximum encoding packet size Nep_max, generating a first codeword by encoding the encoding packet at a mother code rate t, generating a second codeword by selecting [Nep_max/t]-sized code bits from the first codeword, and performing HARQ using the second codeword.

According to still another aspect of the present invention, an apparatus for a receiver in a wireless communication system includes a controller for negotiating with a transmitter for a maximum encoding packet size Nep_max which corresponds to a storage buffer size for one Hybrid Automatic Repeat reQuest (HARQ) channel; and a decoder for decoding a HARQ packet received from the transmitter. When the transmitter has an encoding packet bigger than the maximum encoding packet size, the HARQ packet is generated from a [Nep_max/t]-sized second codeword corresponding to part of a first codeword which is generated at the transmitter by encoding the encoding packet at a mother code rate t.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for communicating a packet bigger than a maximum encoding packet size (e.g., Nep_max) negotiated by a transmitter and a receiver in a HARQ of a wireless communication system. Herein, the maximum encoding packet size indicates a maximum data amount storable per HARQ channel.

Hereinafter, the transmitter and the receiver cover a base station and a terminal. For example, in the downlink, the transmitter is the base station and the receiver is the terminal. In the uplink, the transmitter is the terminal and the receiver is the base station.

According to buffer capability of the terminal, the base station and the terminal negotiate the maximum encoding packet size Nep_max. The base station encodes and transmits to the terminal a packet smaller than or equal to the maximum encoding packet size Nep_max negotiated with the terminal. When a higher data throughput is required, the base station needs to transmit a packet bigger than the maximum encoding packet size negotiated with the terminal, to the terminal. The present invention provides a method for the base station to transmit the packet bigger than the maximum encoding packet size negotiated with the terminal, to the terminal when the high data throughput is required as stated above.

The present invention can be applied to communication systems adopting the HARQ scheme. In the following, a broadband wireless communication system of IEEE 802.16 is illustrated by way of example.

Figure 1:
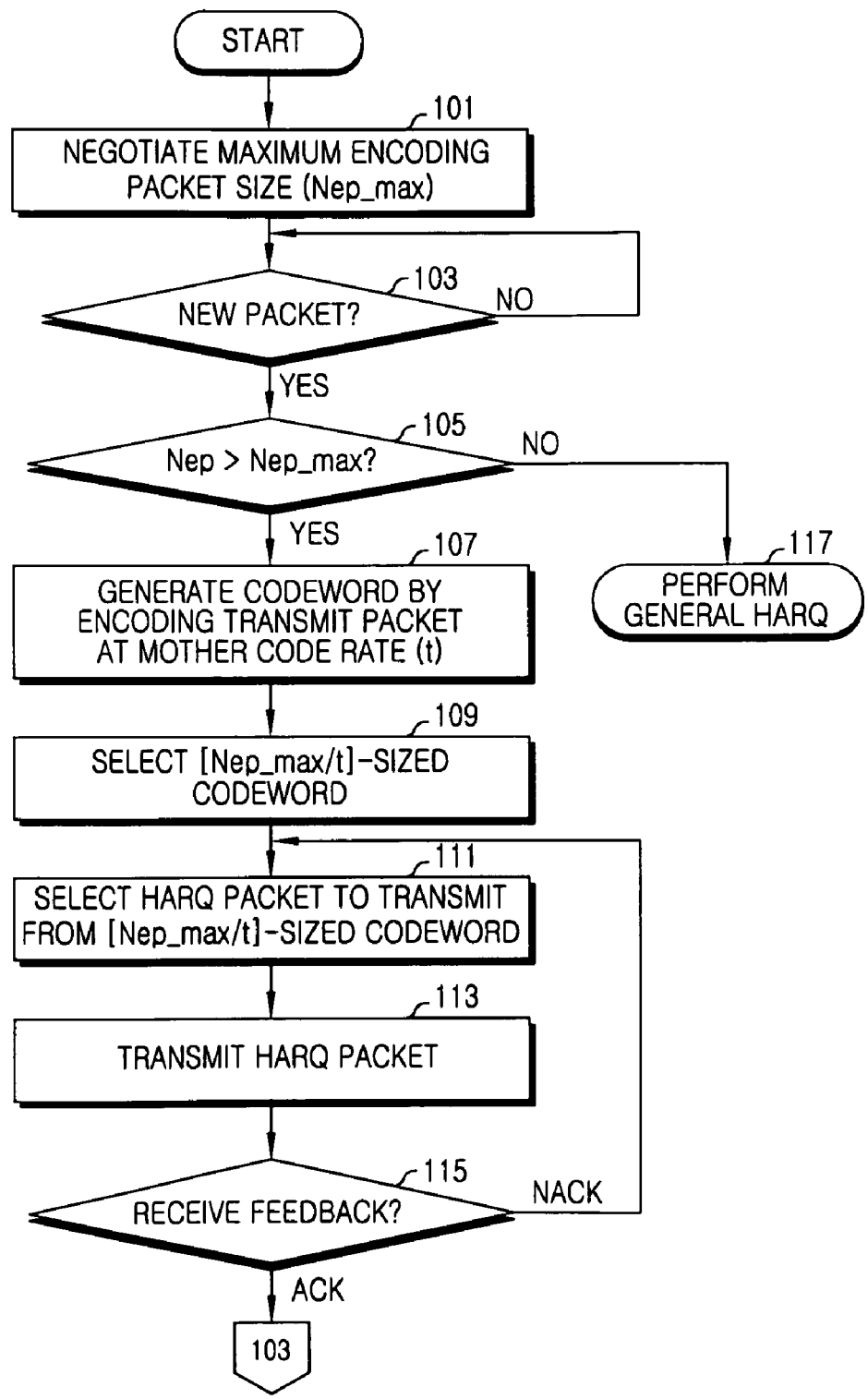
FIG. 1 illustrates operations of a transmitter in a broadband wireless communication system according to an exemplary embodiment of the present invention.

FIG. 1 illustrates operations of the transmitter in the broadband wireless communication system according to an exemplary embodiment of the present invention. By way of example, it is assumed hereafter that the transmitter is the base station.

In step 101, the transmitter negotiates with the receiver for the maximum encoding packet size Nep_max. As such, the transmitter and the receiver determine the maximum encoding packet size by taking into account the HARQ buffer capability of the receiver. For example, the receiver includes a plurality of buffers for a plurality of HARQ channels. The maximum encoding packet size can be determined based on a maximum data amount storable to one buffer. Herein, the buffers can be physically consecutive storage spaces or physically separate storage spaces.

In step 103, the transmitter examines whether there is an encoding packet to transmit to the receiver in the corresponding HARQ channel. Upon detecting the encoding packet to transmit to the receiver, the transmitter determines whether the size Nep of the encoding packet to transmit is greater than the maximum encoding packet size Nep_max in step 105.

When the size Nep of the encoding packet to transmit is smaller than or equal to the maximum encoding packet size Nep_max, the transmitter performs the general HARQ operation in step 117. More particularly, the transmitter generates a codeword by encoding the Nep-length encoding packet at a mother coding rate t, selects the HARQ packet from the codeword according to the HARQ scheme (e.g., Increment Redundancy (IR) or Chase Combining (CC)), and transmits the selected HARQ packet to the receiver. Next, when receiving Negative Acknowledgement (NACK) (the retransmission request) from the receiver, the transmitter selects the retransmission HARQ packet from the codeword and transmits the retransmission HARQ packet to the receiver. Alternatively, when receiving the ACK, the transmitter can finish the transmission of the encoding packet sent to the receiver.

When the size Nep of the encoding packet to transmit is greater than the maximum encoding packet size Nep_max, the transmitter generates a codeword by encoding the encoding packet to transmit at the mother code rate t in step 107. Accordingly, the transmitter generates the codeword of [Nep/t] size.

In step 109, the transmitter selects the codeword of [Nep_max/t] size from the generated codeword of [Nep/t] size. For example, the transmitter can select code bits of [Nep_max/t] size from the start of the [Nep/t]-sized codeword. Herein, the [Nep_max/t]-sized codeword is assumed to include information part. Since the receiver shares the mother code rate information t with the transmitter, the receiver can recognize that the transmitter selects the [Nep_max/t]-sized codeword from the [Nep/t]-sized codeword.

In step 111, the transmitter selects a HARQ packet to transmit to the receiver from the selected [Nep_max/t]-sized codeword. The HARQ packet selection manner of the transmitter can vary according to the HARQ scheme (e.g., IR or CC). For example, it is assumed that the transmitter basically employs the IR scheme and additionally obtains a CC gain. Hence, in the initial transmission, the transmitter can generate the HARQ packet by selecting part of the [Nep_max/t]-sized codeword.

In step 113, the transmitter transmits the generated HARQ packet to the receiver.

In step 115, the transmitter checks whether a feedback signal is received from the receiver.

Receiving the ACK from the receiver, the transmitter returns to step 103 to transmit a next encoding packet.

Alternatively, receiving the NACK (the retransmission request) from the receiver, the transmitter goes back to step 111 to send the HARQ packet according to the retransmission request of the receiver. In step 111, the transmitter selects the HARQ packet to retransmit to the receiver, from the part excluding the previously transmitted part of the [Nep_max/t]-sized codeword.

Next, the transmitter can transmit the selected HARQ packet to the receiver in step 113.

To provide the high data throughput as described above, the transmitter may have to transmit data bigger than the maximum encoding packet size Nep_max negotiated with the receiver. The transmitter encodes a packet bigger than the maximum encoding packet size negotiated with the receiver and selects the [Nep_max/t]-sized codeword from the encoded data. Next, the transmitter splits the selected [Nep_max/t]-sized codeword to the HARQ packets and transmits the HARQ packets to the receiver. Thus, as the transmitter and the receiver send the [Nep_max/t]-sized codeword, the full IR gain in accordance with the buffer capability of the receiver can be attained. When the transmitter retransmits the HARQ packets, the receiver needs to know the codeword length in order to conduct the CC or the IR on the retransmission HARQ packet and the previously received transmit HARQ packet. However, since the transmitter sends the [Nep_max/t]-sized codeword according to the buffer capability of the receiver, it is possible to get rid of the signaling overhead in informing the receiver of the codeword length.

Figure 2:
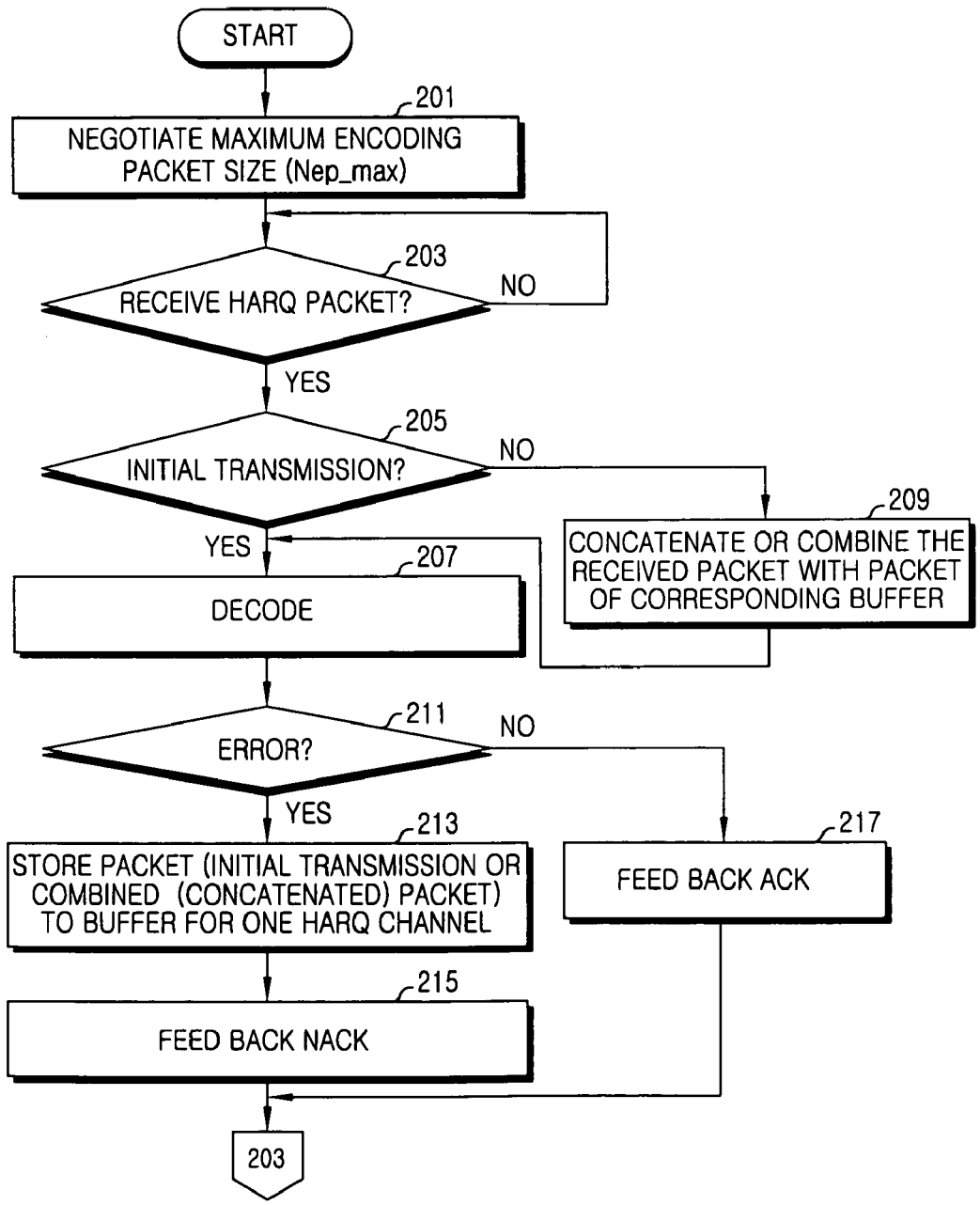
FIG. 2 illustrates operations of a receiver in the broadband wireless communication system according to an exemplary embodiment of the present invention.

FIG. 2 illustrates operations of the receiver in the broadband wireless communication system according to an exemplary embodiment of the present invention. Hereafter, the receiver is assumed to be the terminal.

In step 201, the receiver negotiates with the transmitter for the maximum encoding packet size Nep_max. Accordingly, the transmitter and the receiver can determine the maximum encoding packet size by taking into account the HARQ buffer capability of the receiver. For example, the receiver includes a plurality of buffer for a plurality of HARQ channels. The maximum encoding packet size can be determined based on the maximum data amount storable to one buffer. Herein, the buffers can be physically consecutive storage spaces or physically separate storage spaces.

In step 203, the receiver determines whether a HARQ packet is received over the corresponding HARQ channel.

Upon receiving the HARQ packet, the receiver examines whether the received HARQ packet is an initial transmission packet in step 205.

When the HARQ packet is the initial transmission packet, the receiver decodes the received HARQ packet in step 207 and goes to step 211.

When the HARQ packet is the retransmission packet, the receiver concatenates or combines the received HARQ packet with the packet stored to the corresponding HARQ buffer in step 209.

Next, the receiver decodes the concatenated or combined packet in step 207 and proceeds to step 211.

In step 211, the receiver checks for error of the packet using the packet decoding result. For example, the receiver can check for error of the packet using the error detecting code (e.g., Cyclic Redundancy Check (CRC) code) of the decoded packet.

When the decoded packet is without error, the receiver feeds back the ACK to the transmitter in step 217. Next, the receiver goes back to step 203 to receive a next packet.

Alternatively, when the decoded packet is detected with error, the receiver stores the corresponding packet to the corresponding buffer for one HARQ channel in step 213. Herein, the packet stored to the buffer can be the initial transmission packet, or the concatenated or combined packet of step 209.

In step 215, the receiver sends the NACK (the retransmission request) to the transmitter.

Next, the receiver returns to step 203.

As above, the receiver receives the HARQ packet originated from the [Nep_max/t]-sized codeword and decodes the received packet by concatenating (the IR) or combining (the CC) with the packet stored to the corresponding HARQ buffer. For example, even when the transmitter encodes the packet bigger than the maximum encoding packet size Nep_max negotiated with the receiver, the HARQ is carried out merely with the [Nep_max/t]-sized codeword. Thus, the receiver can process the data of the high transfer rate using the storage space defined for one HARQ channel.

FIGS. 3A through 3D illustrate the HARQ packet generation according to an exemplary embodiment of the present invention.

Figures 3A, 3B, 3C, 3D:
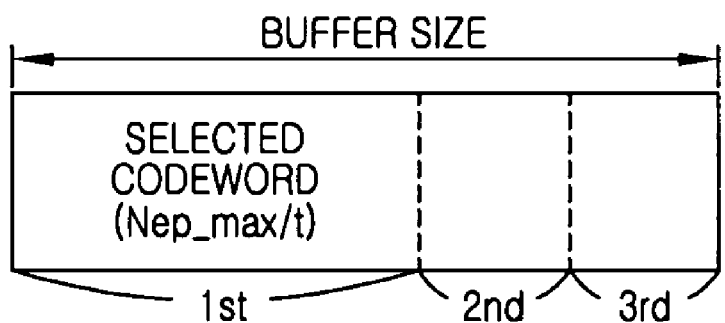
FIGS. 3A through 3D illustrate a HARQ packet generation according to an exemplary embodiment of the present invention.

FIG. 3A illustrates the encoding packet input to an encoder. Herein, it is assumed that the encoding packet size Nep is greater than the pre-negotiated size Nep_max.

FIG. 3B illustrates the codeword generated by encoding the encoding packet at the mother code rate t. Herein, it is assumed that the size of the codeword is [Nep/t] and the mother code rate is ½.

FIG. 3C illustrates the [Nep_max/t]-sized codeword in consideration of the buffer capability of the receiver. The transmitter generates the [Nep_max/t]-sized codeword by selecting part of the [Nep/t]-sized codeword. The transmitter splits the [Nep_max/t]-sized codeword into the HARQ packets and then transmits the HARQ packets. For example, according to the IR, the [Nep_max/t]-sized codeword can be divided into the first HARQ packet, the second HARQ packet, and the third HARQ packet as shown in FIG. 3C.

FIG. 3D illustrates the initial transmission HARQ packet (the first HARQ packet). When the retransmission request (the NACK) is received from the receiver after the initial transmission HARQ packet is transmitted, the transmitter sends the second HARQ packet to the receiver. Next, when receiving the retransmission request again from the receiver, the transmitter sends the third HARQ packet to the receiver. When receiving the retransmission request once again from the receiver, the transmitter can send the first HARQ packet to the receiver. The receiver can perform the IR up to the third HARQ packet and perform the CC on the subsequent HARQ packets received, to decode the packets.

As such, even when the transmitter encodes the packet bigger than the maximum encoding packet size Nep_max negotiated with the receiver, the HARQ is accomplished with the [Nep_max/t]-sized codeword. Thus, the receiver can not only obtain the full IR gain in accordance with its buffer capability but also process the data of the high transfer rate without additional storage space.

Figure 4:
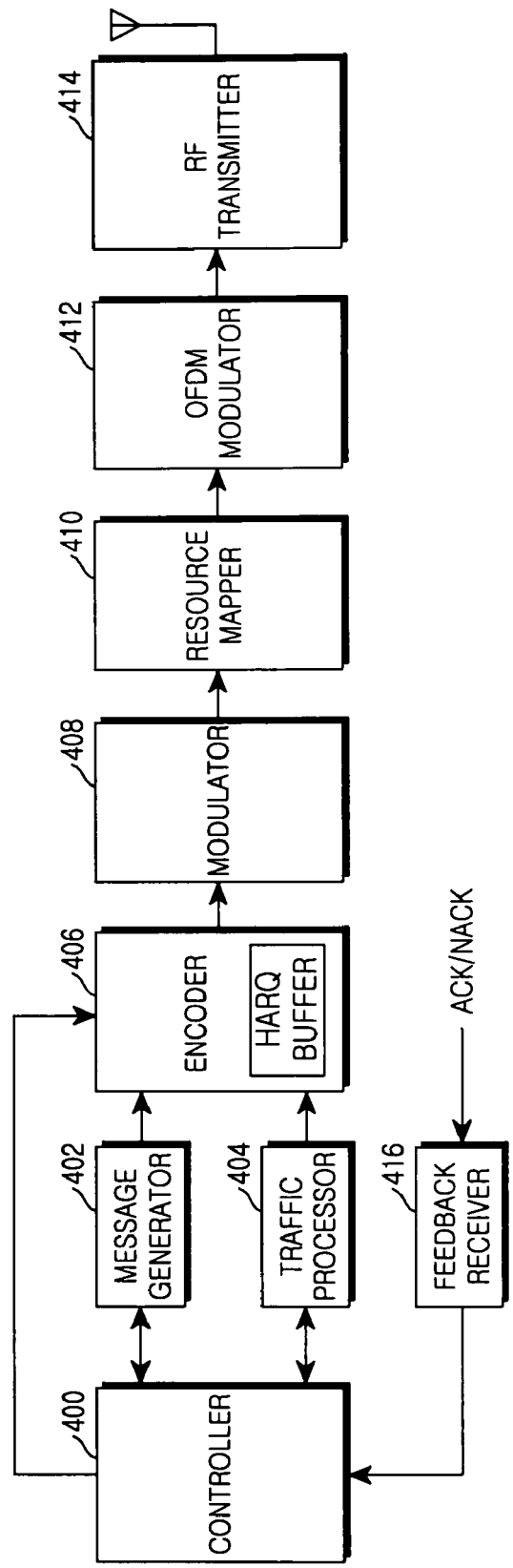
FIG. 4 illustrates a structure of the transmitter in the broadband wireless communication system according to an exemplary embodiment of the present invention.

FIG. 4 illustrates a structure of the transmitter in the broadband wireless communication system according to an exemplary embodiment of the present invention.

The transmitter of FIG. 4 includes a controller 400, a message generator 402, a traffic processor 404, an encoder 406, a modulator 408, a resource mapper 410, an Orthogonal Frequency Division Multiplexing (OFDM) modulator 412, a Radio Frequency (RF) transmitter 414, and a feedback receiver 416. It is hereafter assumed that the transmitter is the base station, and that the feedback receiver 416 is a physical channel receiver for demodulating a fast feedback channel (ACKCH or CQICH).

The controller 400 performs the resource scheduling and controls the corresponding component according to the scheduling result. Also, the controller 400 controls the overall operation according to the HARQ execution. That is, the controller 400 can control a generation of signaling according to the HARQ execution and to transmit packets according to the HARQ. For example, the controller 400 determines the maximum encoding packet size Nep_max by negotiating with the receiver and provides the determined maximum encoding packet size to the encoder 406 of the physical layer. The controller 400 analyzes the signal (ACK or NACK) fed back from the receiver and controls to generate the HARQ packets at the encoder 406 according to the result of the analysis.

Under the control of the controller 400, the message generator 402 generates signaling messages. The traffic processor 404 constitutes the transmit data as data bursts (the encoding packets) and outputs the data bursts to the encoder 406.

The encoder 406 encodes the signaling message output from the message generator 402 and the encoding packets output from the traffic processor 404 at a Modulation and Coding Scheme (MCS) level. Herein, the encoder 406 can employ Convolutional Code (CC), Turbo Code (TC), Convolutional Turbo Code (CTC), Low Density Parity Check (LDPC) code, and so forth.

In the HARQ, the encoder 406 generates the codeword by encoding the encoding packet at the mother code rate t, splits the generated codeword to HARQ packets, and outputs the HARQ packets. The codeword is stored to the HARQ buffer. When the retransmission request (NACK) is received from the receiver, the encoder 406 generates the HARQ packet to retransmit to the receiver by selecting all or part of the codeword stored to the HARQ buffer according to the HARQ scheme (e.g., CC or IR).

When the size of the encoding packet Nep is greater than the maximum encoding packet size Nep_max negotiated with the receiver, the encoder 406 generates the [Nep/t]-sized codeword by encoding the encoding packet at the mother code rate. Next, the encoder 406 selects the [Nep_max/t]-sized codeword from the generated codeword and stores the selected codeword to the HARQ buffer. Hence, the encoder 406 generates the HARQ packets to transmit to the receiver using the [Nep_max/t]-sized codeword stored to the HARQ buffer. In the initial transmission, the encoder 406 generates the HARQ packet to transmit to the receiver by selecting all or part of the [Nep_max/t]-sized codeword. Next, upon receiving the retransmission request from the receiver, the encoder 406 generates the HARQ packet to retransmit to the receiver by selecting all or part of the [Nep_max/t]-sized codeword stored to the HARQ buffer according to the HARQ scheme (e.g. CC or IR).

The modulator 408 generates modulation symbols by modulating the HARQ packet (the initial transmission packet or the retransmission packet) output from the encoder 406 at the MCS level. For example, the modulator 408 can adopt Quadrature Phase Shift Keying (QPSK), 16 Quadrature Amplitude Modulation (QAM), 16QAM, and so forth.

The resource mapper 410 maps the data output from the modulator 408 to preset resources (or subcarriers). The OFDM modulator 412 generates OFDM symbols by OFDM-modulating the resource-mapped data output from the resource mapper 410. Herein, the OFDM modulation includes Inverse Fast Fourier Transform (IFFT) operation and Cyclic Prefix (CP) addition.

The RF transmitter 414 converts the sample data output from the OFDM modulator 412 to an analog signal, converts the analog signal to an RF signal, and transmits the RF signal via an antenna.

The feedback receiver 416 demodulates the feedback signal received over the feedback channel and provides the result to the controller 400. For example, the feedback receiver 416 demodulates the HARQ feedback signal (ACK, NACK, or null) received in a response channel (ACKCH) and provides the result to the controller 400.

Figure 5:
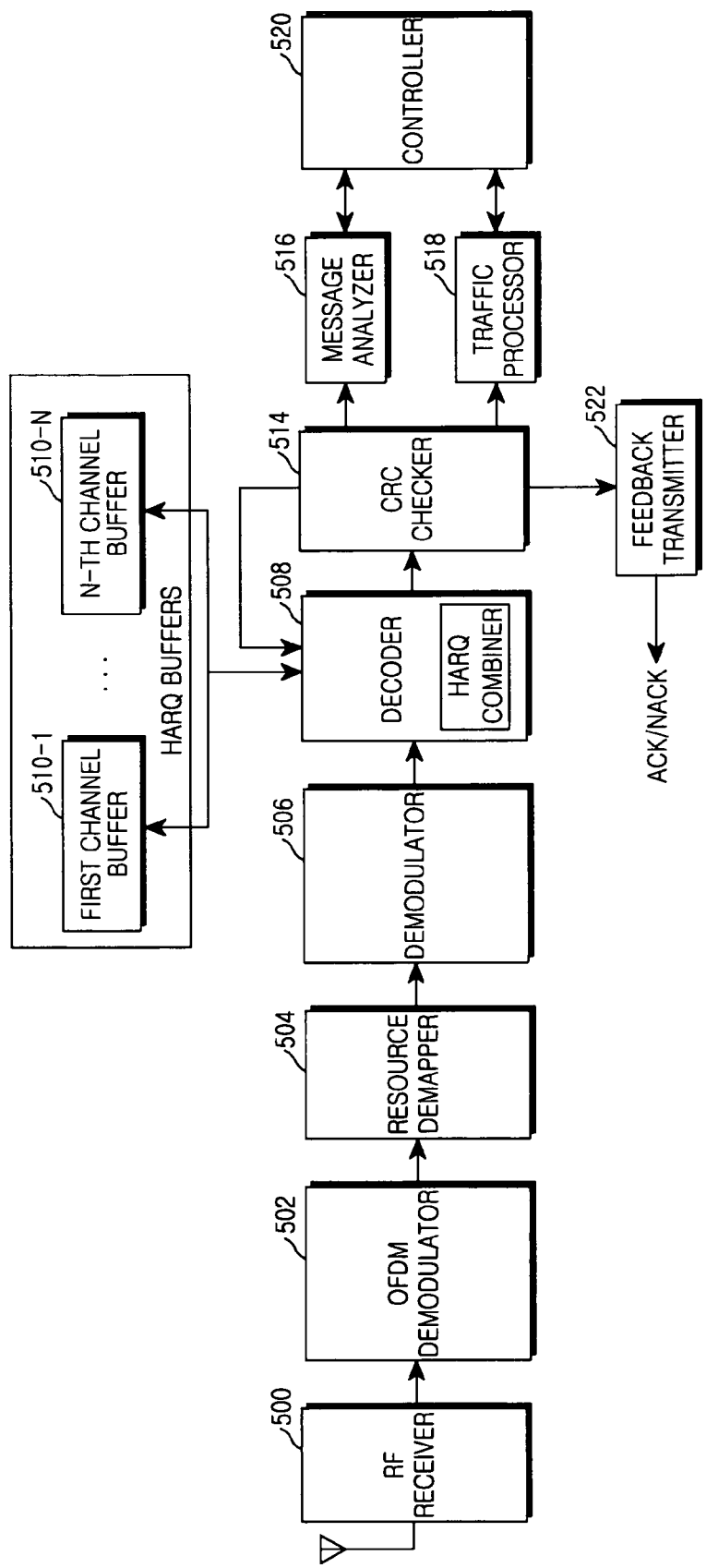
FIG. 5 illustrates a structure of the receiver in the broadband wireless communication system according to an exemplary embodiment of the present invention.

FIG. 5 illustrates a structure of the receiver in the broadband wireless communication system according to an exemplary embodiment of the present invention. The receiver of FIG. 5 includes an RF receiver 500, an OFDM demodulator 502, a resource demapper 504, a demodulator 506, a decoder 508, HARQ buffers 510-1 through 510-N, a CRC checker 514, a message analyzer 516, a traffic processor 518, a controller 520, and a feedback transmitter 522. Hereafter, the receiver is assumed to be the terminal. The feedback transmitter 522 is assumed to be a physical channel transmitter for modulating the signal sent in the fast feedback channel (ACKCH or CQICH).

The RF receiver 500 converts the RF signal received via an antenna to a baseband signal and converts the baseband signal to digital sample data. The OFDM demodulator 502 outputs frequency-domain data by OFDM-demodulating the sample data output from the RF receiver 500. Herein, the OFDM demodulation includes CP elimination and FFT operation.

The resource demapper 504 extracts bursts to demodulate from the frequency-domain data output from the OFDM demodulator 502. The demodulator 506 demodulates the packet output from the resource demapper 504.

The decoder 508 decodes the demodulated data output from the demodulator 506. When the initial transmission HARQ packet is received, the decoder 508 decodes the HARQ packet received from the transmitter. When the retransmission HARQ packet is received, the decoder 508 extracts the previously transmitted packet from the buffer 510-1 through 510-N of the corresponding HARQ channel. Next, the decoder 508 combines or concatenates the extracted packet with the received packet and decodes the combined or concatenated packet.

The CRC checker 514 conducts the CRC on the decoded data output from the decoder 508 and provides the CRC result to the decoder 508 and the feedback transmitter 522. According to the CRC result, the decoder 508 discards the corresponding packet (the initial transmission packet or the concatenated or combined packet), or stores the packet to the buffer 510 of the corresponding HARQ channel.

For instance, the HARQ buffers 510-1 through 510-N include N-ary storage spaces 510-1 through 510-N for the N-ary HARQ channels. Each storage space (buffer) stores the initial transmission packet or the HARQ combined or concatenated packet generated at the decoder 508. Herein, even when the transmitter encodes the packet bigger than the maximum encoding packet size Nep_max negotiated with the receiver, the transmitter carries out the HARQ merely with the [Nep_max/t]-sized codeword. Accordingly, the receiver can process the data of the high transfer rate using the storage space (buffer) defined for one HARQ channel.

The feedback transmitter 522 generates the feedback signal (ACK or NACK) according to the CRC result, modulates the feedback signal, and transmits the modulated feedback signal to the transmitter over the designated response channel (ACKCH).

When the CRC result shows no error in the packet decoded by the decoder 508, the CRC checker 514 forwards the decoded data to a Media Access Control (MAC) layer. When the decoded data is the signaling message, the CRC checker 514 outputs the decoded data to the message analyzer 516. When the decoded data is traffic, the CRC checker 514 outputs the decoded data to the traffic processor 518.

The message analyzer 516 analyzes the signaling message output from the CRC checker 514 and provides the result to the controller 520.

The traffic processor 518 processes the traffic output from the CRC checker 514 in conformity with a corresponding protocol.

The controller 520 can control the operations of the terminal. Also, the controller 520 controls the overall operation in the HARQ execution. More specifically, the controller 520 can control generation of the signaling and can control transmission of the packets according to the HARQ. For example, the controller 520 determines the maximum encoding packet size Nep_max by negotiating with the transmitter and provides the determined maximum encoding packet size to the decoder 508 of the physical layer.

While the downlink communication is described as an example in this exemplary embodiment, the present invention is applicable to the uplink communication.

As set forth above, when the HARQ is performed in the wireless communication system, the present invention can increase the data throughput. Since the HARQ is carried out merely with part of the codeword generated by encoding the packet bigger than the negotiated packet size, the full IR gain in accordance with the buffer capability of the terminal can be acquired. Further, without additional buffer, the data throughput can be raised while not interrupting other HARQ channels.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a packet at a transmitter in a wireless communication system, the method comprising:
   generating a first codeword by encoding an encoding packet at a mother code rate t when the encoding packet is larger than a maximum encoding packet size Nep_max;
   generating a second codeword by selecting [Nep_max/t]-sized code bits from the first codeword; and
   performing a Hybrid Automatic Repeat reQuest (HARQ) using the second codeword.

2. The method of claim 1, wherein the generating of the second codeword comprises:
   generating the second codeword by selecting [Nep_max/t]-sized code bits from a portion of the first codeword.

3. The method of claim 1, wherein the maximum encoding packet size corresponds to a storable buffer size of a receiver for one HARQ channel.

4. The method of claim 1, further comprising:
   negotiating with the receiver for the maximum encoding packet size.

5. The method of claim 1, wherein the performing of the HARQ comprises:
   generating a HARQ packet by selecting all or part of the second codeword according to a HARQ scheme; and
   transmitting the generated HARQ packet to a receiver.

6. The method of claim 5, wherein the performing of the HARQ further comprises:
- after transmitting the HARQ packet, determining whether a retransmission request is received from the receiver;
- when the retransmission request is received, generating a retransmission HARQ packet by selecting all or part of the second codeword; and
- transmitting the retransmission HARQ packet to the receiver.

7. The method of claim 5, wherein the HARQ scheme is any one of a Chase Combining (CC) scheme, an Incremental Redundancy (IR) scheme, and a combination scheme of the CC and the IR.

8. A method for receiving a packet at a receiver of a wireless communication system, the method comprising:
- negotiating with a transmitter for a maximum encoding packet size Nep_max, wherein the maximum encoding size Nep_max corresponds to a storage buffer size for one Hybrid Automatic Repeat reQuest (HARQ) channel;
- receiving a HARQ packet from the transmitter;
- decoding the received HARQ packet when the received HARQ packet is an initial transmission packet;
- storing the received HARQ packet to a buffer for a corresponding HARQ channel when an error is detected from decoding the received HARQ packet; and
- feeding back a retransmission request of the received HARQ packet to the transmitter,
- wherein, when the transmitter has an encoding packet larger than the maximum encoding packet size, the received HARQ packet is generated from a [Nep_max/t]-sized second codeword corresponding to part of a first codeword, the first codeword generated at the transmitter by encoding the encoding packet at a mother code rate t, the [Nep_max/t]-sized second codeword generated by selecting [Nep_max/t]-sized code bits from the first codeword; and a HARQ performed using the [Nep_max/t]-sized second codeword.

9. The method of claim 8, further comprising:
- after feeding back the retransmission request of the received HARQ packet to the transmitter, when a retransmission HARQ packet is received from the transmitter, combining or concatenating the packet stored to the buffer with the received retransmission HARQ packet;
- decoding the combined or concatenated packet;
- when error is detected from the decoded packet, storing the concatenated or combined packet to the buffer; and
- feeding back a retransmission request of the received HARQ packet to the transmitter.

10. An apparatus for a transmitter in a wireless communication system, the apparatus comprising:
- a controller configured to negotiate with a receiver for a maximum encoding packet size Nep_max; and
- an encoder configured to generate a first codeword by encoding the encoding packet at a mother code rate t, configured to generate a second codeword by selecting [Nep_max/t]-sized code bits from the first codeword when an encoding packet is larger than the maximum encoding packet size Nep_max, and configured to perform Hybrid Automatic Repeat reQuest (HARQ) using the second codeword.

11. The apparatus of claim 10, wherein the encoder generates the second codeword by selecting [Nep_max/t]-sized code bits from a portion of the first codeword.

12. The apparatus of claim 10, wherein the maximum encoding packet size corresponds to a storable buffer size of a receiver for one HARQ channel.

13. The apparatus of claim 10, wherein the encoder comprises a HARQ buffer configured to store the second codeword.

14. The apparatus of claim 10, wherein the encoder is configured to generate a HARQ packet by selecting all or part of the second codeword according to a HARQ scheme, and transmit the generated HARQ packet to the receiver.

15. The apparatus of claim 14, wherein the encoder is configured to generate the HARQ packet according to the HARQ scheme which is any one of a Chase Combining (CC) scheme, an Incremental Redundancy (IR) scheme, and a combination scheme of the CC and the IR.

16. The apparatus of claim 10, further comprising:
- a feedback receiver configured to receive, after the HARQ packet is transmitted, a feedback signal from the receiver.

17. The apparatus of claim 16, wherein, when a retransmission request of the receiver is received through the feedback receiver, the encoder generates a retransmission HARQ packet by selecting all or part of the second codeword and transmits the retransmission HARQ packet to the receiver.

18. An apparatus for a receiver in a wireless communication system, the apparatus comprising:
- a controller configured to negotiate with a transmitter for a maximum encoding packet size Nep_max, wherein the maximum encoding size Nep_max corresponds to a storage buffer size for one Hybrid Automatic Repeat reQuest (HARQ) channel; and
- a decoder configured to decode a HARQ packet received from the transmitter,
- wherein, when the transmitter includes an encoding packet larger than the maximum encoding packet size, the HARQ packet is generated from a [Nep_max/t]-sized second codeword corresponding to part of a first codeword, the first codeword generated at the transmitter by encoding the encoding packet at a mother code rate t, the [Nep_max/t]-sized second codeword generated by selecting [Nep_max/t]-sized code bits from the first codeword; and a HARQ performed using the [Nep_max/t]-sized second codeword.

19. The apparatus of claim 18, further comprising:
- at least two buffers for at least two HARQ channels,
- wherein an initial transmission HARQ packet, a HARQ combined packet, and a HARQ concatenated packet for the second codeword are processed using one buffer.

20. The apparatus of claim 18, further comprising:
- an error checker configured to check for error in the HARQ packet with a result of the decoding of the decoder; and
- a feedback transmitter configured to transmit a feedback signal according to the error checking to the transmitter.

* * * * *